United States Patent
Hoze et al.

(10) Patent No.: US 12,182,293 B2
(45) Date of Patent: Dec. 31, 2024

(54) SYSTEM AND METHOD FOR MAINTAINING TENANT DATA ISOLATION IN A MESSAGING SERVICE

(71) Applicant: Gong.io Ltd., Ramat Gan (IL)

(72) Inventors: Nadav Hoze, Kadima (IL); Yoel Amram, Rehovot (IL)

(73) Assignee: GONG.io Ltd., Ramat Gan (IL)

( * ) Notice: Subject to any disclaimer, the term of this patent is extended or adjusted under 35 U.S.C. 154(b) by 320 days.

(21) Appl. No.: 17/456,770

(22) Filed: Nov. 29, 2021

(65) Prior Publication Data
US 2023/0169197 A1    Jun. 1, 2023

(51) Int. Cl.
*H04L 29/00*     (2006.01)
*G06F 21/62*     (2013.01)

(52) U.S. Cl.
CPC ................................ *G06F 21/6227* (2013.01)

(58) Field of Classification Search
CPC .................................................. G06F 21/6227
USPC ......................................................... 726/26
See application file for complete search history.

(56) References Cited

U.S. PATENT DOCUMENTS 10,606,711 B2\* 3/2020 Bishop ................ G06F 11/1438
2021/0240712 A1\* 8/2021 Oscherov .......... G06F 16/24568

OTHER PUBLICATIONS

Berglund, Tim. Confluent Developer "Apache Kafka 101: Topics". https://developer.confluent.io/learn-kafka/apache-kafka/topics/.

\* cited by examiner

*Primary Examiner* — Jeffrey C Pwu
*Assistant Examiner* — Michael D Anderson
(74) *Attorney, Agent, or Firm* — M&B IP Analysts, LLC (57) ABSTRACT

A method and system for maintaining tenant isolation in a messaging service are disclosed. The method includes receiving, in at least one source topic, records sent by a plurality of producer systems associated with a plurality of tenants, wherein each of the plurality of tenants is associated with a unique tenant identifier (ID); partitioning the received records into a plurality of partitions in an intermediate topic based on the respective tenant IDs of respective tenants that sourced the records; grouping, for each of the plurality of partitions in the intermediate topic, records within the partition into an isolated batch, wherein the records in each isolated batch belong to the same tenant; and placing the isolated batches in a destination topic to be consumed system by a consumer, wherein the isolated batches are placed in the destination topic in a round-robin manner.

23 Claims, 5 Drawing Sheets

SYSTEM AND METHOD FOR MAINTAINING TENANT DATA ISOLATION IN A MESSAGING SERVICE

TECHNICAL FIELD

The present disclosure generally relates to messaging services, and more specifically to maintaining data in messaging services.

BACKGROUND

Cloud messaging services provide reliable interconnectivity between programs, applications, and components as such, in the cloud system. An example for such a messaging service is Apache® Kafka. A messaging service collects streams of data from multiple sources to provide valuable information to the subscribers of the service. To this end, security of data is a critical component for subscribers and the messaging services. Moreover, with the abundance and continuous supply of data in the current cloud computing era, data processing efficiencies also need to be accounted for.

A typical messaging service implements a server acting as a broker to accept data records of data by producers and let consumers fetch data for further processing. The broker server receives records (messages) from producers and stores such records on the disk, keyed by a unique offset. The consumers can fetch the stored records by topic, partition, and offset. Records are commonly organized and fetched based on topics. A topic is a category/feed name to which records are stored and published. Topic records are stored in partitions, with each partition holding the records in the order in which they came in. Producers are the sources of data from different tenants (or companies) publishing to the messaging service. Thus, records from different tenants can be stored in the same topic or partition. As such, a consumer that reads a bulk of records may process data of different tenants contained in the same bulk. This creates a risk of data breach, with consumers potentially being able to access or leak data from tenants to which the consumers should not have access in the context of the bulk processing.

For example, data stored in current messaging services are encrypted and secured according to various compliance regulations. However, during the consumption stages of the service data pipeline, unaccounted-for errors can occur and result in data exposure to undesired sources. For example, data from one company can be mixed with data of another company, and the processing results will not be isolated.

Some currently implemented modes of data consumption in messaging services include single record consumption and batch record consumption. In single record consumption, only one record is received by the consumer at a time to allow for isolation of source records by default. In this scenario, isolation of records ensures secure processing of each record without mixing between different sources. However, single record consumption is highly inefficient because that multiple instances of fetching of data are required to process the data required, thereby resulting in high processing time, increased latency, and network traffic. Further, such solution is not efficiently scalable.

Batch record consumption groups records within a partition into batches to improve performance of the messaging service, including the consumer. Unlike single record consumption, consumption in batches enables faster, more efficient processing of the data by consuming the data in bulk. The grouped batches may include records from multiple tenants within each batch, thereby undermining the security of the data. As noted above, currently implemented modes fall short in addressing both security and efficiency in messaging services, including the consumer.

It would therefore be advantageous to provide a solution that would overcome the challenges noted above to increase security, fairness, and performance of messaging services.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for maintaining tenant isolation in a messaging service. The method comprises receiving, in at least one source topic, records sent by a plurality of producer systems associated with a plurality of tenants, wherein each of the plurality of tenants is associated with a unique tenant identifier (ID); partitioning the received records into a plurality of partitions in an intermediate topic based on the respective tenant IDs of respective tenants that sourced the records; grouping, for each of the plurality of partitions in the intermediate topic, records within the partition into an isolated batch, wherein the records in each isolated batch belong to the same tenant; and placing the isolated batches in a destination topic to be consumed by a consumer system, wherein the isolated batches are placed in the destination topic in a round-robin manner.

Certain embodiments disclosed herein include a system for maintaining tenant isolation in a messaging service, comprising: a processing circuitry; and a memory, the memory containing instructions that, when executed by the processing circuitry, configure the system to: receive, in at least one source topic, records sent by one or a plurality of producer systems associated with a plurality of tenants, wherein each of the plurality of tenants is associated with a unique tenant identifier (ID); partition the received records into a plurality of partitions in an intermediate topic based on the respective tenant IDs of respective tenants that sourced the records; group, for each of the plurality of partitions in the intermediate topic, records within the partition into an isolated batch, wherein the records in each isolated batch belong to the same tenant; and place the isolated batches in a destination topic to be consumed by a consumer system, wherein the isolated batches are placed in the destination topic in a round-robin manner.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments present systems and methods for maintaining isolated tenant batches for secure and efficient processing of data in messaging services. The isolated tenant batches are generated through repartitioning based on tenants followed by grouping, thereby preventing mixing of records even with possible errors or hacking or data-mining attempts at the consumer stage. Furthermore, the isolated tenant batches are grouped with a set restriction of a batch size or time to provide balanced batch sizes. Such balanced batch sizes allows for faster processing by reducing traffic and backlogs as compared to consumption including a number of larger batches. Records as discussed herein should be construed to include any type of data to be processed by the messaging services such as, but not limited to, events, messages, signals, media files or other attachments, and so on.

For a messaging service that serves multiple tenants, subscribers, or companies (hereinafter "tenants" or a "tenant") that use a particular service or services), in addition to security of data, nondiscriminatory consumption of records is advantageous. While isolated tenant batches eliminate the undesired risk of exposing data to other tenants, this mode of consumption can be biased in a manner that favors larger tenants while severely deprioritizing smaller tenants. Such biased and unfair treatment, particularly as tenants who are deprioritized this way are much more likely to experience negative effects on efficiency of delivery for their services. This bias is the result of technical challenges related to the ways in which data is currently consumed as noted above. To address these technical challenges, the disclosed embodiments provide techniques for even distribution of isolated tenant batches among published partitions. Using the disclosed techniques, tenant batches may be dispersed without favoritism based on their tenant identifier or a total number of isolated tenant batches, thereby allowing equal opportunity for tenants of various sizes for consumption.

In various disclosed embodiments, larger tenants may be dispersed in different partitions to enable concurrent consumption and parallel processing. In an embodiment, the substantially evenly distributed tenant batches facilitate horizontal scale-out with the addition of customer instances. According to the disclosed embodiments, destination topics of substantially evenly distributed isolated tenant batches ensure messaging services that satisfy security of subscribers' data and nondiscriminatory consumption. Moreover, the impartial consumption of isolated tenant batches may provide improved computer performance by reducing traffic and enhancing processing speed.

The disclosed embodiments allow for utilizing batches to improve efficiency of data consumption for data from a variety of tenants while ensuring that data from different tenants are not improperly mixed. The disclosed embodiments can be scaled up easily by increasing the number of consumer threads or instances to account for additional isolated tenant batches while ensuring that no tenant is given precedence over.

Figure 1:
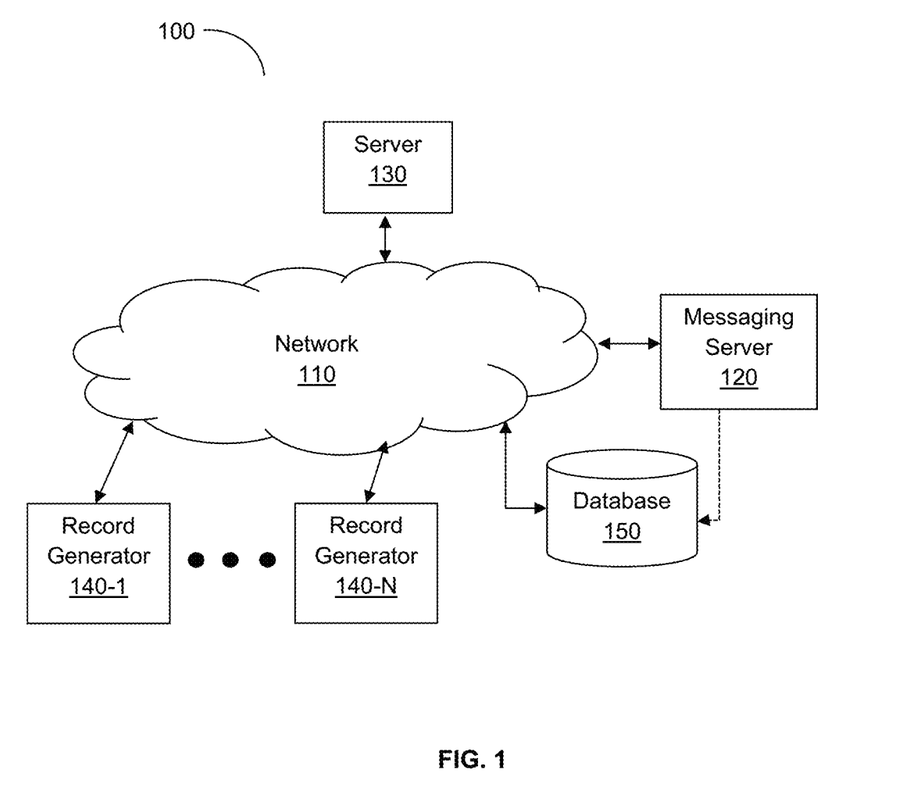
FIG. 1 is a network diagram utilized to describe the various disclosed embodiments.

FIG. 1 shows an example network diagram 100 utilized to describe the various disclosed embodiments. In the example network diagram 100, a plurality of record generators 140-1 through 140-N (hereinafter referred to individually as a record generator 140 and collectively as record generators 140, where N is an integer equal to 1), a messaging server 120, at least one processing server 130, and a database 150 are communicatively connected via a network 110. The network may be but is not limited to, a wireless, cellular or wired network, a local area network (LAN), a wide area network (WAN), a metro area network (MAN), the Internet, the worldwide web (WWW), similar networks, and any combination thereof.

The database 150 may communicate with the messaging server 120, either directly or over the network 110. In certain embodiments, the database 150 may be a non-structured query language (NoSQL) type of database such as, but not limited to, MongoDB. In certain embodiments, the database 150 may include a relational database such as, but not limited to, Oracle®, Sybase®, Microsoft SQL Server®, Access®, Ingres®, and the like. In an embodiment, the database 150 may be a plurality of logical entities residing in the same physical structure.

In certain embodiments, the messaging server 120 and/or the processing server 130 can be deployed in a cloud computing platform (not depicted in FIG. 1). The processing server 130 may perform various functions or processes on data records received from the messaging server 120. For example, the processing server 130 may process textual records to label such records. The processing server 130 may be configured to process records to generate sales or deal intelligence. For example, records may include textual communication between a salesperson and a prospect client, and such communication processing may result in insights into the sale process.

The processing server 130 may execute one or more agents, such as heuristic and/or machine learning algorithms to process such data. In certain such embodiments, the processing server 130 may receive records from the messaging server 120 via the network 110, thereby acting as a consumer of the output of the messaging service implemented by the messaging server 120.

Each record generator 140 may be, but is not limited to, a device, a gateway, a platform, or an application. By way of illustration, in some example embodiments where record generator 140 is a device that may be, but is not limited to, a personal computer, a mobile device, a laptop, a desktop computer, a tablet computer, a smartphone, a wearable computing device, an appliance or any other device capable of receiving, processing, and displaying information. In some implementations, record generator 140 may be a streaming server configured to stream data records (events). In some embodiments, records may include, but are not limited to, text, audio, images, video, scripts, or any type of content. For example, the records may include email messages, text messages, images, documents, recorded conversations, audio/video streams, and so on.

In an embodiment, a record generator 140 may send records to the messaging server 120 via the network 110, thereby acting as a producer to the messaging service implemented by the messaging server 120. In an embodiment, each record generator 140 may be associated with a respective tenant. Thus, records of a specific tenant are streamed or sent to the messaging server 120 by the respective record generator 140.

The messaging server 120 is configured to implement messaging services for the record generators 140 (producers) and the processing server 130 (consumer). According to the disclosed embodiments, the messaging server 120 is configured to allow isolation of records provided by the record generators 140 (and hence tenants), while maintaining fairness among the various record generators 140. To this aim, the messaging server 120 is configured to hold or otherwise maintain an intermediate topic that allows repartition of records received from the record generators 140 in order to group the records into isolated groups, where each group includes records of the same tenant. In an embodiment, such isolated groups are saved in the database 150. A topic (source, intermediate, or destination) may be realized as a data structured stored in a memory.

To this end, the messaging server 120 is configured to receive records into a source topic. The records are sent in a round-robin manner. The messaging server 120 is further configured to consume the records and to repartition the records into the intermediate topic with each record being saved in the intermediate topic with the respective tenant identifier (ID). As such, records of the same tenant are saved in the same partition. Thereafter, the messaging server 120 is configured to group the records having the same tenant ID from the same partition into a batch in order to create isolated tenant batches that are isolated per tenant. The messaging server 120 is configured to place or otherwise store the isolated tenant batches in a destination topic to be sent to the processing server 130. All records in a given isolated tenant batch are sent at the same time or at approximately the same time in a batched manner to the processing server 130. The messaging server 120 is configured to place all such isolated tenant batches in the destination topic in a round-robin manner. As such, each tenant having records to be sent to the processing server 130 receives substantially equal time to send such records. The operation of the messaging server 120 is discussed in detail below.

In certain embodiments, the messaging server 120 may be integrated in or connected to any conventional messaging broker. Examples of such message brokers include a messaging broker Apache® Kafka, Apache® Pulsar, and the like. In certain embodiments, messaging server 120 may be implemented as a physical machine, a virtual machine, and/or a combination thereof. An example block diagram of a messaging server 120 is provided in FIG. 5.

Figure 2:
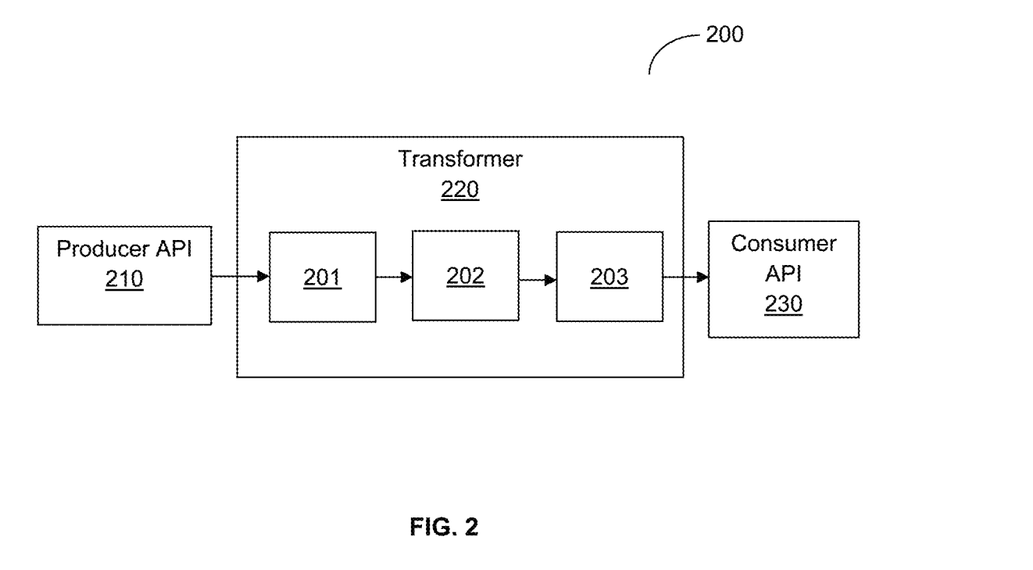
FIG. 2 is a flow diagram illustrating logical components of the messaging service according to an embodiment.

FIG. 2 is an example diagram 200 illustrating logical components of the messaging server 120 according to an embodiment. In an embodiment, the logical components may be configured to generate isolated tenant batches that are fairly processed in the messaging service as described herein. The components shown in FIG. 2 include a producer application programming interface (API) 210, a transformer 220, and a consumer API 230. Further, at least 3 topics are utilized in the process of generating isolated tenant batches: one or more source topics 201, one or more intermediate topics 202, and one or more destination topics 203. A topic is a category or feed name to which records are stored and published. As noted above, a topic may be realized as a data structured stored in a memory. Topic records are stored in partitions, with each partition holding its respective records which may be organized according to the order in which they received.

As noted above, record generators (e.g., the record generators 140, FIG. 1) stream records through the producer API 210, thereby acting as producers. In an embodiment, a producer may publish such a record to a source topic 201. Each source topic 201 includes multiple partitions (not shown) having records received from at least one tenant (associated with a producer) in the order of occurrence. The records may be sent randomly, but substantially evenly distributed among the partitions to result in a similar number of records in each partition. In a typical configuration, multiple source topics are maintained by the messaging server 120.

In an embodiment, the source topics 201 may be consumed by the transformer 220 for further processing and reconfiguration. The transformer 220, according to this embodiment, is configured to perform two steps of partitioning to provide a destination topic 203 that is composed of isolated tenant batches that are substantially evenly distributed among partitions of each topic. More particularly, a first partitioning may reconfigure records with respect to tenant IDs, or other indexing identification, as the partition key, which can then be grouped into isolated tenant batches that include only records of the same tenant as intermediate topics 202. In an embodiment, the records are grouped into isolated tenant batches defined by a records limit parameter which is defined based size or time, thereby creating batches including, or that may be expected or predicted to include, similar numbers of records. A size of batch may be defined by a number of records and the time be defined by the number of records received during a predefined time interval. As an example, a batch size may be 100 records. As another example, a batch includes all records received through 10 minutes. In an embodiment, a second partitioning may redistribute the isolated tenant batches substantially evenly across the partitions of the destination topic(s) 203. The two steps of partitioning are discussed further below.

In a further embodiment, the destination topics 203 may be fed to a consumer (e.g., a processing service 130, FIG. 1) via the consumer API 230. As noted above, each of the destination topics 203 includes isolated tenant batches that are substantially evenly distributed among the partitions, thereby allowing even or fair distribution of tenant batches among consumers. In this case, consumption and ultimately processing of isolated tenant batches may be performed concurrently at different consumers for unbiased and efficient processing of isolated tenant batches. Moreover, even distribution of tenant batches and the resulting balanced partition enable horizontal scaling by adding additional consumers to concurrently consume isolated tenant batches and increase processing performance as additional tenant data to be consumed is received. Each isolated tenant batch, in some example embodiments, may be sent as a single message to the consumer.

In an exemplary embodiment, all records are maintained by destination topic(s) 203 until the consumer (e.g., the server 130, FIG. 1) acknowledges consumption of such records. Based upon receipt of such acknowledgement, the record may be removed from the destination topic(s) 203. In another embodiment, all records are maintained by destination topic(s) 203 based on a retention policy. The retention policy may be defined based on aging or other parameters to remove records from the destination topic. In such example embodiments, no records are lost in the event that the consumer does not receive the records (e.g., due to a failure). In such a case, when the consumer is restored, all records in the topics may be transmitted to the consumer again. The acknowledgement may also serve as an offset within the topic designating the last batch read from the topic.

Figure 3:
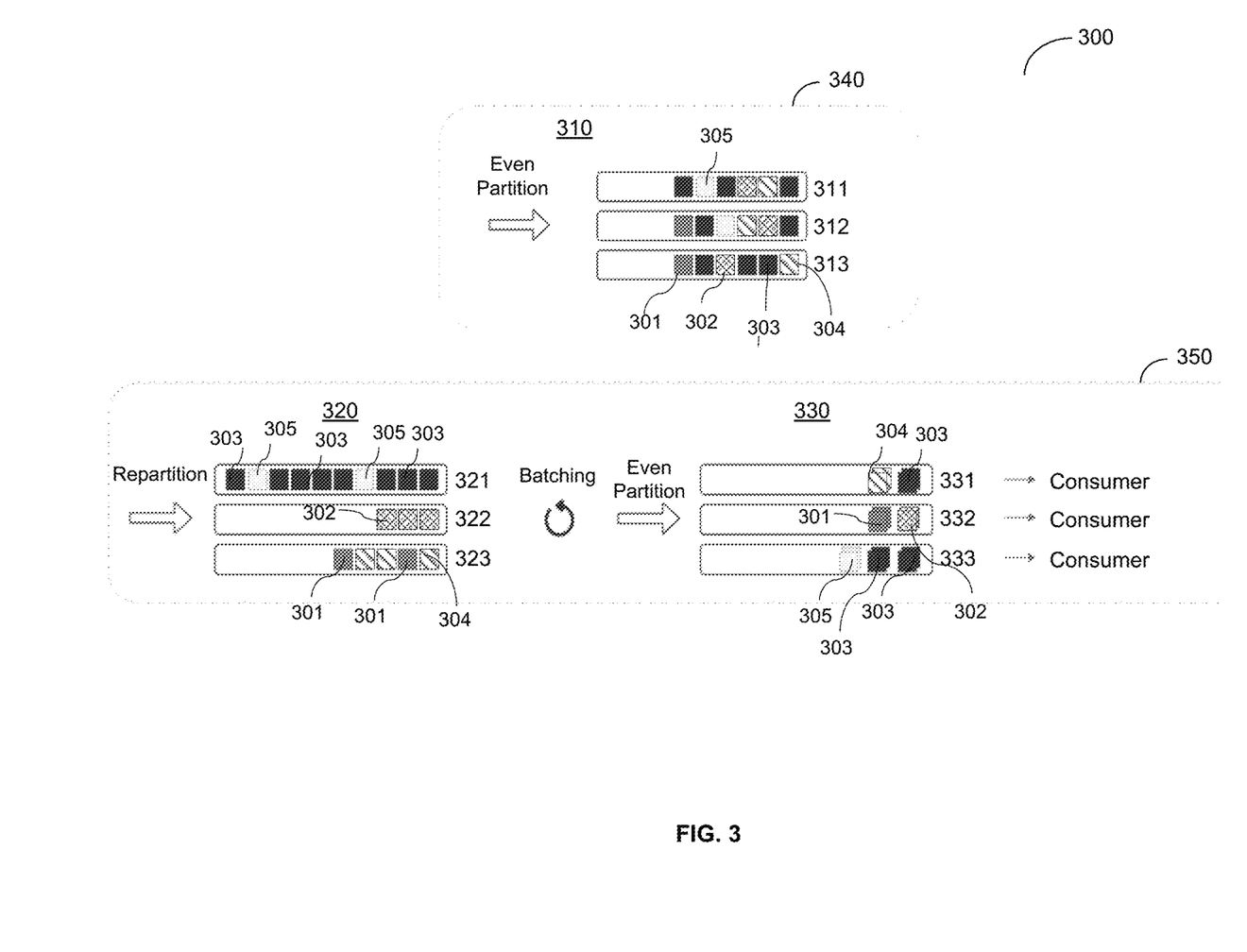
FIG. 3 is a flow diagram illustrating a process of generating and distributing isolated tenant batches according to an example embodiment.

FIG. 3 is an example flow diagram 300 illustrating a process of generating and distributing isolated tenant batches according to an example embodiment.

An example source topic 310 includes three partitions 311 through 313 and is published by a producer 340. Records (shown as squares) and labeled as 301, 302, 303, 304, and 305 to identify their respective tenant ID. The records are published in chronological order and evenly distributed among the partitions 311 through 313 of the source topic 310 regardless of their tenant ID.

The source topic 310 may then be consumed by a transformer 350 of the messaging server for further processing. An intermediate topic 320 is generated through repartitioning of the consumed records in the source topic 310 based on their respective tenant IDs. Similar to the source topic 310, the example intermediate topic 320 depicted in FIG. 3 includes three partitions 321 through 323, but each partition only includes records from the designated tenants. In various embodiments, each partition 321 through 323 may include records from different tenants. Specifically, all records from the same tenant are placed in only one partition (321, 322, or 323) in the intermediate topic 320. That is, records from a specific tenant may not be distributed into multiple partitions, but one partition may include records from multiple tenants, without departing from the scope of the disclosure.

Next, records in the intermediate topic 320 are grouped into batches based on their tenant IDs to create isolated tenant batches. In an embodiment, the size of the batches is controlled so as to result in balanced or predicted-to-be-balanced batch sizes. In this regard, certain tenants that generate large number of records may be grouped into one or more batches (e.g., records keyed with tenant ID 303). By limiting the number of records in batch, isolated batches are more evenly balanced, which allows for avoiding discriminatory processing based on size of batches, and further allows for increased scalability, without causing backlogs or precedence to certain tenants.

In an example embodiment, records in partitions 321 through 323 are grouped into isolated tenant batches in the destination topic 330 in a round-robin manner. Three partitions 331 through 333 of the destination topic 330 include isolated batches of different tenants (having IDs 301 through 305) that are substantially evenly distributed among them regardless of their tenant ID. Such distribution of isolated tenant batches allows for avoiding discriminatory processing based on size of batches, and, and further allows for increased scalability, without causing backlogs or precedence to certain tenants.

The destination topic 330 can be provided for consumption at or by associated consumers without any risk of mixing data between tenants since each batch includes records from the same tenant. It should be noted from FIG. 3 that the tenant having the ID 303 includes the largest number of records and thus, multiple (three in this example) tenant isolated tenant batches are created. Moreover, the multiple isolated tenant batches of a tenant having the ID 303 are distributed among the three partitions in the destination topic 330 to prevent processing from being focused on the larger tenant as such and further to allow parallel processing for efficiency. It should be emphasized that a number of records in an isolated tenant batch is limited by the records limit parameter regardless of how many records a single tenant has in the source topic 310.

It should be noted that the example embodiment in FIG. 3. illustrates the process of generating and evenly distributing isolated tenant batches of a single source topic 310. However, in certain embodiments, such isolated tenant batches may be generated for multiple source topics published by multiple producers within the messaging service servers (e.g., 120, FIG. 1) without departing from the scope of the disclosed embodiments.

Figure 4:
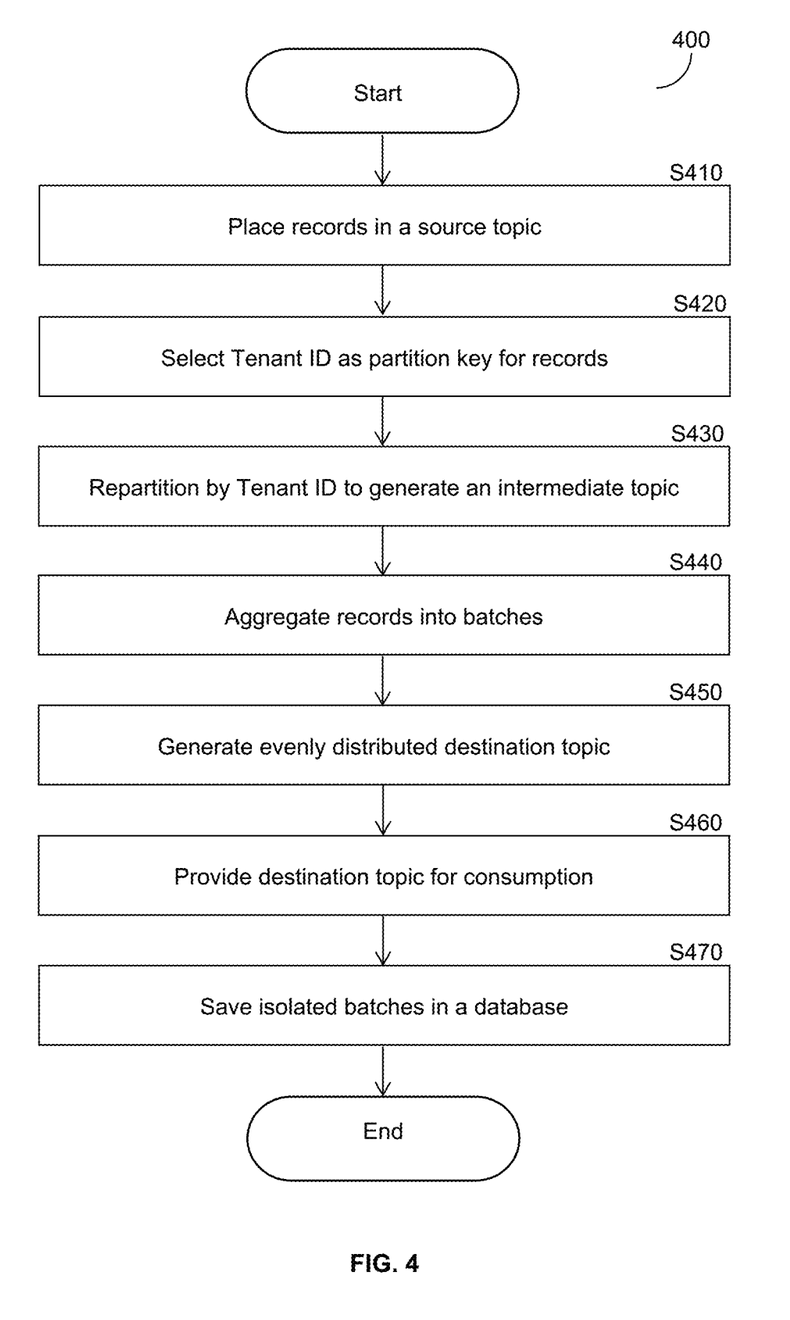
FIG. 4 is a flowchart illustrating a method for maintaining tenant batch isolation and generating a destination topic according to an embodiment.

FIG. 4 is an example flowchart 400 illustrating a method for maintaining tenant batch isolation and generating a destination topic according to an embodiment. The method described herein may be executed by the messaging server 120 the processor server 130, or both.

At S410, records from one more producers (e.g., record generators 140, FIG. 1) are placed in a source topic. A record may include text, audio, images, video, scripts, or any type of content. For example, the records may include email messages, text messages, images, documents, recorded conversations, and the like. In an embodiment, the records are extracted from the messages and published in partitions in the order they are received. To this end, the records may be evenly but randomly distributed into different partitions using, for example, in a round-robin manner.

At S420, a tenant identifier (ID) is selected as a partition key for the records. The tenant ID is a unique identifier for each tenant that uses the messaging server 120. In an embodiment, the tenant ID identifies the tenant from which the record was received. It should be noted that other unique identifiers to key the records may be utilized in accordance with the disclosed embodiments.

At S430, the records are repartitioned, based on their respective tenant IDs to generate an intermediate topic. In an embodiment, the partitions of the intermediate topic include records from the same tenant. For example, a first partition may include all records of a first tenant and all records of a second tenant. Creating separate partitions for each tenant can provide extra security and protection against potential data breaches, but may also be more costly and difficult to implement. In certain embodiments, records keyed with different tenant IDs may be assigned to a single partition in the intermediate topic, so that a single partition, in the intermediate topic, may include records from one or more tenants.

At S440, the repartitioned records, in the intermediate topic, are aggregated into batches. The records within the partition are aggregated into batches, in the intermediate topic, according to their tenant IDs in order to create isolated tenant batches, e.g., batches that are isolated by tenant. In an embodiment, aggregation of each batch may be performed based on a records limit parameter. As noted above, such parameter may include a batch size and a predefined time interval. Limiting the number of records in a batch based on the limiting parameter allows to prevent unbalanced tenant batches from being processed. Accordingly, aggregation of repartitioned records may result in one or more isolated tenant batches that are, for example, equal or smaller than the maximum batch size, for each of the tenant and balanced in batch size between the isolated tenant batches. As an example, without the records limit parameter, a tenant with a high rate of record generation may have a much larger batch than a tenant with a lower rate. Thus, enforcing the records limit parameter on the number of records in a batch allows for avoiding discriminatory processing based on the size of batches. This further provides for increased scalability without causing backlogs or precedence to certain tenants. In an embodiment, the records limit parameter may be predetermined and stored in a memory. In a further embodiment, a dedicated state store may be configured to retain the tenant batch states in the messaging server.

In an embodiment, all records of a single tenant are included or placed in only one partition of the intermediate topic. The batching process performed at S440 includes reading the records from the source topic, batching the read records, and sending the batch to the destination topic. This process may be performed in parallel by different consumer threads or instances. In such a configuration, each consumer thread is configured to process a subset of all partitions (one or more partitions, depending on the number of consumers). Thus, when batching a single tenant, the tenant's records are required to reside in only one partition. This allows the batching process to be easily scaled and spread across many consumer systems.

At S450, at least one destination topic is generated. In an embodiment, the destination topic includes partitions with similar numbers of isolated tenant batches that are substantially evenly distributed among the partitions. Such distribution of tenant batches not only allows for balanced distribution of isolated tenant batches for efficient processing, but also enables nondiscriminatory processing amongst the tenants of the messaging service. In an example implementation, the tenant batches may be substantially evenly distributed in a round-robin manner. It should be noted that each partition may include isolated tenant batches that have different tenant IDs (i.e., tenant batches of different tenants). It should be noted that round-robin is only one example for a scheduling algorithm that achieves fairness, and the disclosed embodiments can operate with other types of preemptive scheduling algorithms.

At S460, the generated destination topic is provided for consumption by a consumer. In an embodiment, a consumer is provided with isolated tenant batches, where each batch includes records of the same tenant. This prevents mix-ups of data between the tenants, and therefore strengthens security of data. Moreover, more than one tenant batch of a specific tenant can be processed in parallel to increase processing efficiency for each of the tenants. In a further embodiment, additional consumer instances may be configured to scale out (horizontally) and increase the number of tenant batches to be consumed concurrently, where the limit for scaling is or is based on the number of partitions.

Optionally, at S470, the isolated tenant batches sent to the consumer are also saved in a database, e.g., the database 150, FIG. 1. As an example, records saved in the database 150 may be utilized for backup purposes.

In an embodiment, records may be kept in the destination topic based on a retention policy. The retention policy may be defined based on aging or other parameters to remove records from the topic. In another embodiment, such records are kept in the destination topic until the consumer receives an acknowledgment. In such example embodiments, no records are lost if the consumer does not receive the records (e.g., due to a failure). Thus, when the consumer is restored, all records in the topics may be transmitted to the consumer again.

As a non-limiting example, the received records may include email messages from different companies. Such email messages may be required to be processed by the consumer (e.g., the server 130, FIG. 1) in order to identify search key words (e.g., sale price, deliver date, proposal date, and the like). Such key words can later be used for sales intelligence, deal flow intelligence, and the like. The embodiments disclosed herein allow batching of email messages from different companies into isolated tenant batches to be processed separately and independently by the consumer, thereby maintaining security of data.

It should be noted that the disclosed embodiments provide a scalable messaging service. As isolated tenant batches are substantially evenly balanced and distributed fairly among all partitions, the scale requirements of messaging services are met. Further, the more consumers are added, the more tenant batches can be consumed concurrently without giving any precedence or anticipated or substantial overall precedence to one tenant over another.

Figure 5:
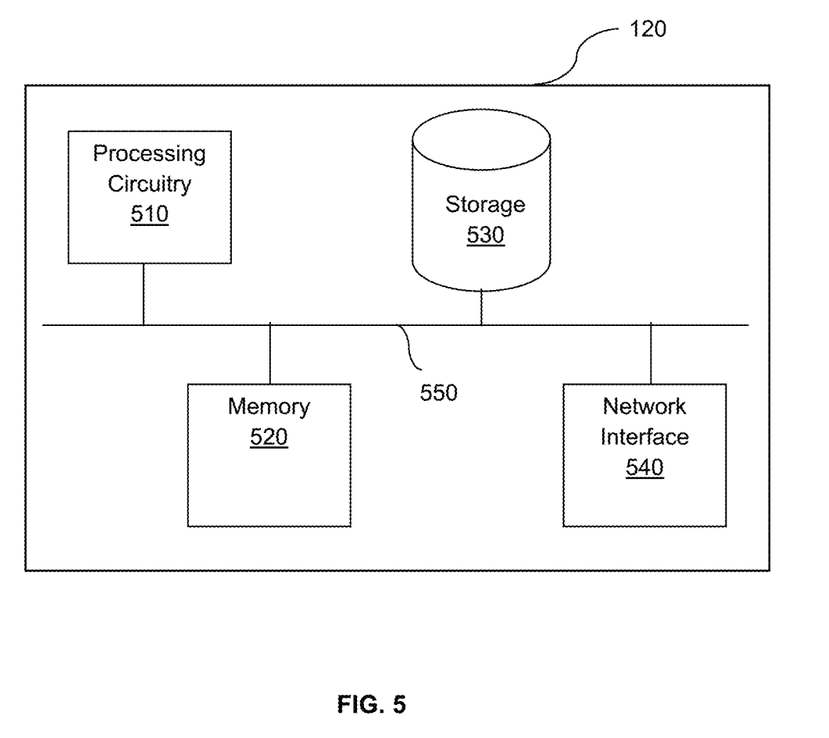
FIG. 5 is a schematic diagram of a messaging server according to an embodiment.

FIG. 5 is an example schematic diagram of the messaging server 120 according to an embodiment. The server 130 includes a processing circuitry 510 coupled to a memory 520, a storage 530, and a network interface 540. In an embodiment, the components of the user device 130 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 540 allows the messaging server 120 to communicate with the record generators (140, FIG. 1) and processing servers 130 for the purpose of, for example, receiving data (records or batches), sending data (records or batches), and the like.

It should be understood that the embodiments described herein are not limited to the specific architecture illustrated in FIG. 5, and other architectures may be equally used without departing from the scope of the disclosed embodiments. It should be further noted that a processing server (130, FIG. 1) may be structured using a similar architecture shown in FIG. 5.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

What is claimed is:

1. A method for maintaining tenant isolation in a messaging service, comprising:
    receiving, in at least one source topic, records sent by a plurality of producer systems associated with respective ones of a plurality of tenants, wherein each of the plurality of tenants is associated with a unique tenant identifier (ID) and wherein each of the at least one source topic includes a plurality of partitions each of which is adapted to store records received from at least one of the tenants in the order of receipt and each respective record contains the unique tenant ID of the tenant sourcing the record;
    partitioning the received records into a plurality of partitions in an intermediate topic based on the respective tenant IDs of respective tenants that sourced the records;
    grouping, for each of the plurality of partitions in the intermediate topic, records within the partition into an isolated batch, wherein the records in each isolated batch belong to the same tenant; and
    placing the isolated batches in a destination topic to be consumed by a consumer system, wherein the isolated batches are placed in the destination topic in a round-robin manner;
    wherein each of the source, intermediate, and destination topics are realized as respective data structures stored in memory and wherein each partition of any topic is a memory area within that topic.

2. The method of claim 1, wherein all records from the same tenant are stored in only one partition of the plurality of partitions in the intermediate topic.

3. The method of claim 2, wherein grouping, for each of the plurality of partitions in the intermediate topic, records within the partition into an isolated batch further comprises:
    instantiating a plurality of consumer threads in the consumer system, wherein consumer threads group records of different tenants in parallel, and wherein each consumer thread groups all records of a tenant stored in a single partition in the intermediate topic into one or more isolated batches, the records in each of the one or more isolated batches are substantially evenly distributed.

4. The method of claim 1, further comprising:
    placing the received records in the at least one source topic in a round-robin manner.

5. The method of claim 1, wherein the respective size of each isolated batch is fixed by a predefined records limit parameter.

6. The method of claim 5, wherein the predefined records limit parameter is any of: a number of records, and a time interval for reception of records.

7. The method of claim 1, wherein each partition in the intermediate topic stores records keyed with at least one respective tenant ID for the intermediate topic.

8. The method of claim 1, wherein each of the plurality of producer systems is at least a record generator configured to stream records to the at least one source topic.

9. The method of claim 1, wherein the consumer system is at least a processing server configured to process the records per tenant.

10. The method of claim 9, wherein the processing of the records by the processing server generates at least deal flow intelligence for each tenant.

11. The method of claim 1, wherein the records are substantially evenly distributed among the partitions of the source topic so as to result in a similar number of records being stored in each partition of the source topic.

12. A non-transitory computer readable medium having stored thereon instructions for causing a processing circuitry to execute a process for maintaining tenant isolation in a messaging service, the process comprising:
    receiving, in at least one source topic, records sent by a plurality of producer systems associated with respective ones of a plurality of tenants, wherein each of the plurality of tenants is associated with a unique tenant identifier (ID) and wherein each of the at least one source topic includes a plurality of partitions each of which is adapted to store records received from at least one of the tenants in the order of receipt and each respective record contains the unique tenant ID of the tenant sourcing the record;

partitioning the received records into a plurality of partitions in an intermediate topic based on the respective tenant IDs of respective tenants that sourced the records;

grouping, for each of the plurality of partitions in the intermediate topic, records within the partition into an isolated batch, wherein the records in each isolated batch belong to the same tenant; and placing the isolated batches in a destination topic to be consumed by a consumer system, wherein the isolated batches are placed in the destination topic in a round-robin manner;

wherein each of the source, intermediate, and destination topics are realized as respective data structures stored in memory and wherein each partition of any topic is a memory area within that topic.

13. A system for maintaining tenant isolation in a messaging service, comprising:

a processing circuitry; and a memory, the memory containing instructions that, when executed by the processing circuitry, configure the system to:

receive, in at least one source topic, records sent by a plurality of producer systems associated with respective ones of a plurality of tenants, wherein each of the plurality of tenants is associated with a unique tenant identifier (ID) and wherein each of the at least one source topic includes a plurality of partitions each of which is adapted to store records received from at least one of the tenants in the order of receipt and each respective record contains the unique tenant ID of the tenant sourcing the record;

partition the received records into a plurality of partitions in an intermediate topic based on the respective tenant IDs of respective tenants that sourced the records;

group, for each of the plurality of partitions in the intermediate topic, records within the partition into an isolated batch, wherein the records in each isolated batch belong to the same tenant; and place the isolated batches in a destination topic to be consumed by a consumer system, wherein the isolated batches are placed in the destination topic in a robin-round manner;

wherein each of the source, intermediate, and destination topics are realized as respective data structures stored in the memory and wherein each partition of any topic is a memory area within that topic.

14. The system of claim 13, wherein all records from the same tenant are stored in only one partition of the plurality of partitions in the intermediate topic.

15. The system of claim 14, wherein the system is further configured to:

instantiate a plurality of consumer threads in the consumer system, wherein consumer threads group records of different tenants in parallel, and wherein each consumer thread groups all records of a tenant stored in a single partition in the intermediate topic into one or more isolated batches, the records in each of the one or more isolated batches are substantially evenly distributed.

16. The system of claim 13, wherein the system is further configured to:

place the received records in the at least one source topic in a round robin manner.

17. The system of claim 13, wherein the respective size of each isolated batch is fixed by a predefined parameter.

18. The system of claim 17, wherein the predefined parameter is any of: a number of records, and a time interval.

19. The system of claim 13, wherein each partition in the intermediate topic stores records keyed with at least one respective tenant ID for the intermediate topic.

20. The system of claim 13, wherein each of the plurality of producer systems is at least a record generator configure to steam data records to the at least one source topic.

21. The system of claim 13, wherein the consumer system is at least a processing server configured to process the records per tenant.

22. The system of claim 21, wherein the processing of the records by the processing server generates with at least deal flow intelligence for each tenant.

23. The system of claim 13, wherein the records are substantially evenly distributed among the partitions of the source topic so as to result in a similar number of records being stored in each partition of the source topic.

* * * * *